(12) United States Patent
Patterson et al.

(10) Patent No.: US 8,863,483 B2
(45) Date of Patent: Oct. 21, 2014

(54) SWATHER WITH FLOATING HEADER CARRIED ON A MOUNTING ASSEMBLY WHICH CAN BE RAISED AND LOWERED

(71) Applicant: MacDon Industries Ltd., Winnipeg (CA)

(72) Inventors: Roger L. Patterson, Duncan (CA); Andrew William Dean Bell, Winnipeg (CA); John Edward Enns, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 13/679,065

(22) Filed: Nov. 16, 2012

(65) Prior Publication Data

US 2013/0333343 A1 Dec. 19, 2013

Related U.S. Application Data

(60) Provisional application No. 61/560,339, filed on Nov. 16, 2011.

(51) Int. Cl.
| | | |
|---|---|---|
| A01D 41/14 | (2006.01) | |
| A01D 41/127 | (2006.01) | |
| A01D 46/08 | (2006.01) | |
| A01D 43/06 | (2006.01) | |
| A01D 43/04 | (2006.01) | |
| A01D 43/077 | (2006.01) | |
| A01D 34/00 | (2006.01) | |
| A01D 57/20 | (2006.01) | |

(52) U.S. Cl.
CPC ................ *A01D 43/06* (2013.01); *A01D 43/04* (2013.01); *A01D 43/077* (2013.01); *A01D 34/008* (2013.01); *A01D 57/20* (2013.01)
USPC ....................................... 56/10.2 R; 56/10.2 E

(58) Field of Classification Search
CPC ... A01D 41/141; A01D 41/14; A01D 75/287; Y10S 56/03; Y10S 56/10
USPC ............. 56/10.2 E, 208, 10.2 G, 10.2 R, 209; 701/50
See application file for complete search history.

(56) References Cited

U.S. PATENT DOCUMENTS 3,623,304 A * 11/1971 Molzahn .......................... 56/208
4,206,584 A   6/1980 Johnson et al.
(Continued)

FOREIGN PATENT DOCUMENTS

| CA | 2624556 | 9/2008 |
|---|---|---|
| CA | 2665589 | 11/2010 |

*Primary Examiner* — Árpád Fábián-Kovács
(74) *Attorney, Agent, or Firm* — Adrian D. Battison; Ade & Company Inc.

(57) ABSTRACT

A swather tractor has hydraulically driven wheels at a cab end and castor wheels at an engine end. It can be driven cab forward in a working mode with a header on the forward end. It is rotated to engine forward in the transport position for more stable higher speed travel. There is provided a float module with adjustable and calibrated springs connected between a mounting assembly on the tractor and pivotal support arms of the float assembly where the mounting assembly can be raised and lowered by a lift system on the tractor. This allows the header to float relative to the lift system on the tractor. The float force of the springs is adjusted by raising and lowering the lift system in dependence on an angle measurement of the lift position of the header as it floats relative to the mounting assembly.

9 Claims, 17 Drawing Sheets

(56) References Cited

U.S. PATENT DOCUMENTS

| | | | |
|---|---|---|---|
| 4,401,009 A * | 8/1983 | Zeuner et al. | 91/28 |
| 4,473,993 A | 10/1984 | Jennings | |
| 4,622,803 A * | 11/1986 | Lech | 56/10.2 E |
| 4,733,523 A * | 3/1988 | Dedeyne et al. | 56/209 |
| 5,157,905 A | 10/1992 | Talbot et al. | |
| 5,237,802 A * | 8/1993 | Fachini et al. | 56/10.2 E |
| 5,359,836 A * | 11/1994 | Zeuner et al. | 56/10.2 E |
| 6,073,431 A | 6/2000 | Osborne et al. | |
| 6,681,551 B1 * | 1/2004 | Sheidler et al. | 56/10.2 G |
| 6,971,452 B2 | 12/2005 | Ocsenknecht et al. | |
| 7,159,687 B2 | 1/2007 | Dunn | |
| 7,191,582 B2 * | 3/2007 | Bomleny | 56/10.2 E |
| 7,197,865 B1 | 4/2007 | Enns | |
| 7,347,277 B2 | 3/2008 | Enns | |
| 7,373,769 B2 | 5/2008 | Talbot | |
| 7,430,846 B2 | 10/2008 | Bomleny et al. | |
| 7,472,533 B2 | 1/2009 | Talbot | |
| 7,552,577 B2 * | 6/2009 | Strosser | 56/10.2 R |
| 7,555,883 B2 * | 7/2009 | Fackler et al. | 56/10.2 E |
| 7,603,837 B2 * | 10/2009 | Ehrhart et al. | 56/10.2 E |
| 7,703,266 B2 * | 4/2010 | Fackler et al. | 56/10.2 E |
| 7,707,811 B1 * | 5/2010 | Strosser | 56/10.2 E |
| 7,721,830 B2 | 5/2010 | Dunn | |
| 7,918,076 B2 | 4/2011 | Talbot | |
| 7,958,706 B2 | 6/2011 | Remillard | |
| 8,020,648 B2 | 9/2011 | Otto | |
| 8,051,632 B2 * | 11/2011 | Strosser | 56/10.2 R |
| 8,225,903 B2 | 7/2012 | Dunn | |
| 8,245,489 B2 | 8/2012 | Talbot | |
| 2007/0012009 A1 * | 1/2007 | Hoffman et al. | 56/10.2 R |
| 2007/0068129 A1 | 3/2007 | Strosser | |
| 2008/0072560 A1 | 3/2008 | Talbot | |
| 2010/0281837 A1 | 11/2010 | Talbot | |

* cited by examiner

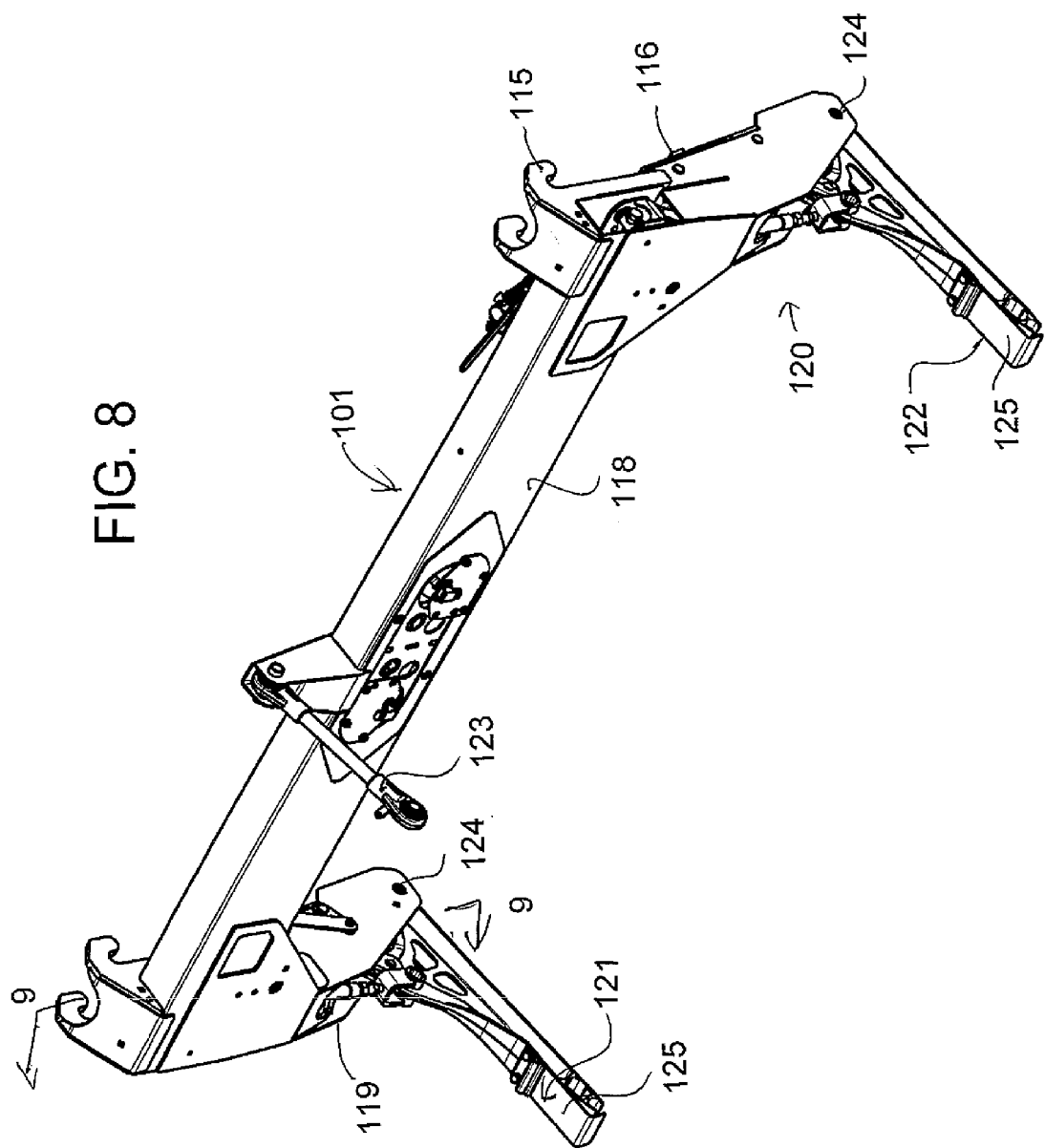

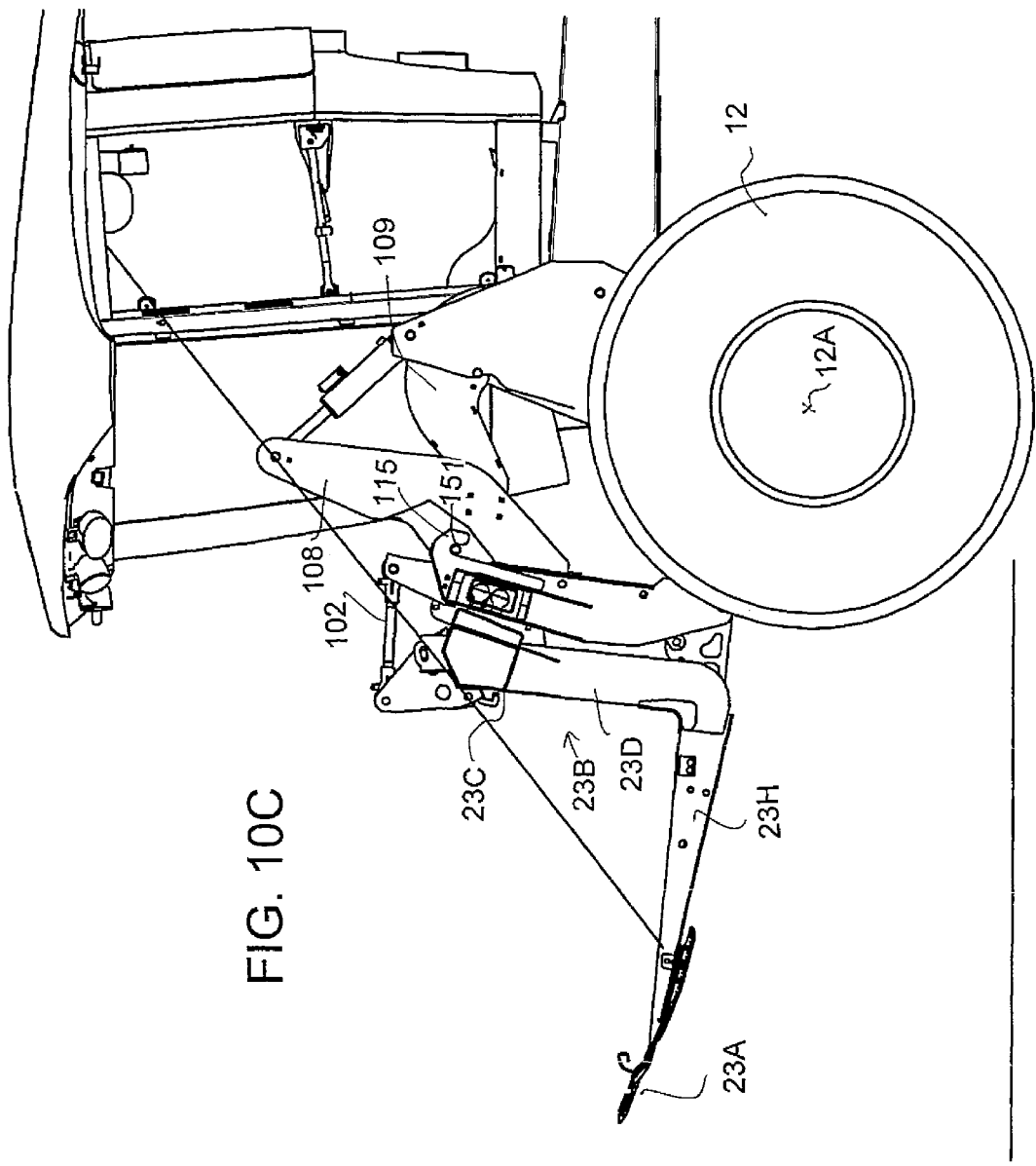

SWATHER WITH FLOATING HEADER CARRIED ON A MOUNTING ASSEMBLY WHICH CAN BE RAISED AND LOWERED

This application claims the benefit under 35 USC 119(e) of Provisional Application 61/560,339 filed Nov. 16, 2011.

This invention relates to a swather including a header and a transport vehicle. In particular the invention relates to the cooperation between the support vehicle and the header which allows the header to float in movement across the ground. The swather typically forms the harvested crop material into a swath commonly at a central discharge of the header for deposit on the ground. The header includes typically a sickle knife for cutting the standing crop.

RELATED PRIOR PATENTS AND APPLICATIONS

Reference is made to the following patents and applications by the same assignee, the disclosure of each of which is incorporated herein by reference as they disclose further details which may be used in the machines disclosed herein:

U.S. Pat. No. 8,245,469 (Talbot) issued Aug. 21, 2012 which discloses a combine harvester where the header is carried on gauge wheels.

U.S. Pat. No. 8,225,903 (Dunn) issued Jul. 24, 200712 which discloses a tractor of the type suitable for use herein where the tractor includes a suspension system.

U.S. Pat. No. 8,020,648 (Otto) issued Sep. 20, 2011 which discloses a tractor of the type suitable for use herein where the tractor has a rear suspension.

U.S. Pat. No. 7,958,706 (Remillard) issued Jun. 14, 2011 which discloses a tractor of the type suitable for use herein where the tractor includes a reel speed control.

U.S. Pat. No. 7,918,076 (Talbot) issued Apr. 5, 2011 which discloses a header of the type suitable for use herein where the header has three sections which include a balance of lifting forces across the three sections.

U.S. Pat. No. 7,721,830 (Dunn) issued May 25, 2010 which discloses a tractor of the type suitable for use herein with steering control.

U.S. Pat. No. 7,373,769 (Talbot) issued May 20, 2008 which discloses a header with a wear shield under the cutter bar.

U.S. Pat. No. 7,347,277 (Enns) issued Mar. 25, 2008 which discloses a header with a self-contained transport system.

U.S. Pat. No. 7,472,533 (Talbot) issued Jan. 6, 2009 which discloses a header with a cutter bar and draper with a seal between the draper and cutter bar.

U.S. Pat. No. 7,159,687 (Dunn) issued Jan. 9, 2007 which discloses a tractor of the type suitable for use herein where the tractor carries a header across a front face thereof for movement across the field for forming a swath from a standing crop where the tractor can be reversed in direction for transport.

U.S. Pat. No. 7,197,865 (Enns) issued Apr. 3, 2007 which discloses a header for mounting across a front face of the tractor above for movement across the field for forming a swath from a standing crop where the header includes ground wheels movable from field positions to a transport position where the header can be turned through 90 degrees and pulled by the tractor in a longitudinal direction behind the tractor.

BACKGROUND OF THE INVENTION

This invention relates to a crop harvesting machine for harvesting standing crop.

A machine of this type generally includes a crop header for cutting a standing crop including a header frame, a cutter extending across a front cutter bar of the header frame for cutting the crop, and a transport system operable to transport the crop to a central discharge opening of the header so as to form a swath.

Typically the cutter is a sickle knife of the type described in the above patents but in some cases other types of cutter can be used. In many cases the transport device is a draper but other types of transport including augers can be used.

The machine further includes a tractor for carrying the header including a tractor frame having a first end and a second end, ground wheels for supporting the tractor in movement across the ground including a pair of transversely spaced first wheels at the first end, a mounting assembly at the first end of the tractor frame for supporting the header, and a lift arrangement for raising and lowering the mounting assembly.

In some cases the tractor can be a swather tractor where the first ground wheels and the mounting assembly are arranged such that the swath when discharged from the central discharge opening passes between the first ground wheels and components of the mounting assembly so as to be deposited as a swath behind the tractor. In most cases there is provided a spring float assembly connecting the header frame to the mounting assembly so as to allow floating movement of the header relative to the mounting assembly of the tractor.

SUMMARY OF THE INVENTION

According to one aspect of the invention there is provided a swather comprising:
  a crop header for cutting a standing crop comprising:
  a header frame;
  a cutter extending across a front cutter bar of the header frame for cutting the crop;
  and a transport system operable to transport the crop to a central discharge opening of the header so as to form a swath;
  a tractor for carrying the header comprising:
  a tractor frame having a first end and a second end;
  ground wheels for supporting the tractor in movement across the ground including a pair of transversely spaced first wheels at the first end;
  a mounting assembly at the first end of the tractor frame for supporting the header;
  a lift arrangement for raising and lowering the mounting assembly;
  the first ground wheels and the mounting assembly being arranged such that the swath when discharged from the central discharge opening the swath passes between the first ground wheels and components of the mounting assembly so as to be deposited as a swath behind the tractor;
  a spring float assembly connecting the header frame to the mounting assembly so as to allow up and down floating movement of the header relative to the mounting assembly over a range of floating movement of the header;
  wherein the mounting assembly is arranged to hold a frame of the spring float assembly in a position which is fixed in height relative to the mounting assembly so that the frame of spring float assembly moves upwardly and downwardly with the mounting assembly;
  a detector for providing an output signal indicative of a position of the header within the range of floating movement relative to a position fixed in height relative to the mounting assembly;

and a control system responsive to the signal for controlling the lift arrangement so as to raise and lower the lift arrangement with an objective to maintain the signal constant.

Preferably the spring float assembly includes a pair of forwardly extending bottom arms each extending into an engagement with a frame member of the frame of the header.

Preferably the spring float assembly includes a pair of resilient springs and a coupling for connecting each of the springs to a respective one of the bottom arms.

Preferably the springs are horizontal across a top of the spring float assembly.

Preferably the couplings extend downwardly to pull upwardly on the bottom arms.

Preferably the spring float assembly includes a pair of resilient springs each for applying a spring force to the header frame through a coupling and wherein the coupling includes a crank system which is arranged to change a mechanical advantage of the spring force from the spring so as to apply a force to the header frame which is tailored to a required force different from the spring force.

Preferably the coupling is arranged such that the required force includes a first portion which is substantially constant over a range of up and down movement of the header and a second portion at an upper end of the range which decreases so as to reduce the lifting force on the header.

Preferably the mounting assembly is arranged to hold the spring float assembly for pivotal movement about an axis transverse to the tractor and wherein there is provided an actuator operable to cause pivotal movement to selected angles around the axis.

Preferably the mounting assembly comprises a pair of arms each pivotal on the tractor about an axis transverse to the tractor with the spring float assembly connected at fixed position on a forward end of the arms and wherein the lift arrangement is arranged for lifting the arms in common parallel movement and for holding the arms in fixed positions determined by the lift arrangement to prevent float of the arms under loads from the header.

Preferably the detector is mounted on a pivot arm which moves in response to the position of the header within the range of floating movement and is arranged to detect an angle of the arm relative to a pivot axis of the arm.

Preferably the detector is mounted on one of the bottom arms and is arranged to detect an angle of the bottom arm relative to a frame of the spring float assembly.

According to a second aspect of the invention there is provided a swather comprising:

a crop header for cutting a standing crop comprising:
a header frame;
a cutter extending across a front cutter bar of the header frame for cutting the crop;
and a transport system operable to transport the crop to a central discharge opening of the header so as to form a swath;
a tractor for carrying the header comprising:
a tractor frame having a first end and a second end;
ground wheels for supporting the tractor in movement across the ground including a pair of transversely spaced first wheels at the first end;
a mounting assembly at the first end of the tractor frame for supporting the header;
a lift arrangement for raising and lowering the mounting assembly;
the first ground wheels and the mounting assembly being arranged such that the swath when discharged from the central discharge opening the swath passes between the first ground wheels so as to be deposited as a swath behind the tractor;
a spring float assembly connecting the header frame to the mounting assembly so as to allow up and down floating movement of the header relative to the mounting assembly over a total range of floating movement of the header;
the spring float arrangement including at least one spring and a coupling arranged to change a mechanical advantage of the spring force from said at least one spring so as to apply a lifting force to the header which is tailored to a required force different from the spring force;
wherein the spring force arrangement is arranged such that the total range of movement includes a first range and a second range where the lifting force applied to the header includes a first lifting force in the first range of floating movement of the header and a second lifting force in the second range of floating movement of the header in which the second lifting force is reduced relative to the first lifting force to allow the header to fall more quickly;
and a control system for maintaining the header frame at a preferred position in the total range of movement including a manually operable input operable by an operator of the swather for adjusting the preferred position.

The present arrangement can be used with a header where the cutter bar rests on the ground and floats over the ground or in an arrangement where the header is carried on gauge wheels. In both cases the float system acts in the same way to carry a majority of the weight of the header and leave a smaller part to sit on the ground either through the cutter bar or through the gauge wheels.

The float system can be used on a rigid type header where the cutter bar remains substantially straight or can be used with flex type headers where the cutter bar flexes or the header is formed in sections which can move relative to one another Preferably the tractor is of the type commonly used as a swather tractor includes an engine mounted on the tractor frame; at least one hydraulic pump driven by the engine for generating a source of hydraulic fluid under pressure for driving components of the tractor and components of the header when attached to the tractor; two driven wheels of the tractor mounted at the first end of the tractor; two non-driven castor wheels of the tractor mounted at the second end of the tractor and a cab mounted on the tractor frame at the first end.

Preferably there is provided an operator's seat and control assembly arranged for controlling driving movement of the tractor in both a first end forward position and in a second end forward position, the control assembly including a steering control and a speed control; wherein each of the driven wheels including a respective drive motor driven by hydraulic fluid from the at least one hydraulic pump; wherein the speed control is arranged to control a rate of supply of hydraulic fluid from the at least one hydraulic pump to the respective drive motor to control a common speed of rotation of the driven wheels and thus a speed of movement of the tractor; and wherein the steering control is arranged to control a differential in rate of supply of hydraulic fluid from the at least one hydraulic pump to the respective drive motor to control a relative speed of rotation of the driven wheels and thus a turning direction of the tractor.

BRIEF DESCRIPTION OF THE DRAWINGS

One embodiment of the invention will now be described in conjunction with the accompanying drawings in which:

FIG. 8 is an isometric view of the float assembly of FIG. 4 removed from the header and the tractor.

FIG. 10C is a schematic side elevational view of the machine of FIG. 10A showing the header in a third position in which the cutter bar is lifted to a highest position in which the cutter bar can clear a swath.

In the drawings like characters of reference indicate corresponding parts in the different figures.

DETAILED DESCRIPTION

Figure 1:
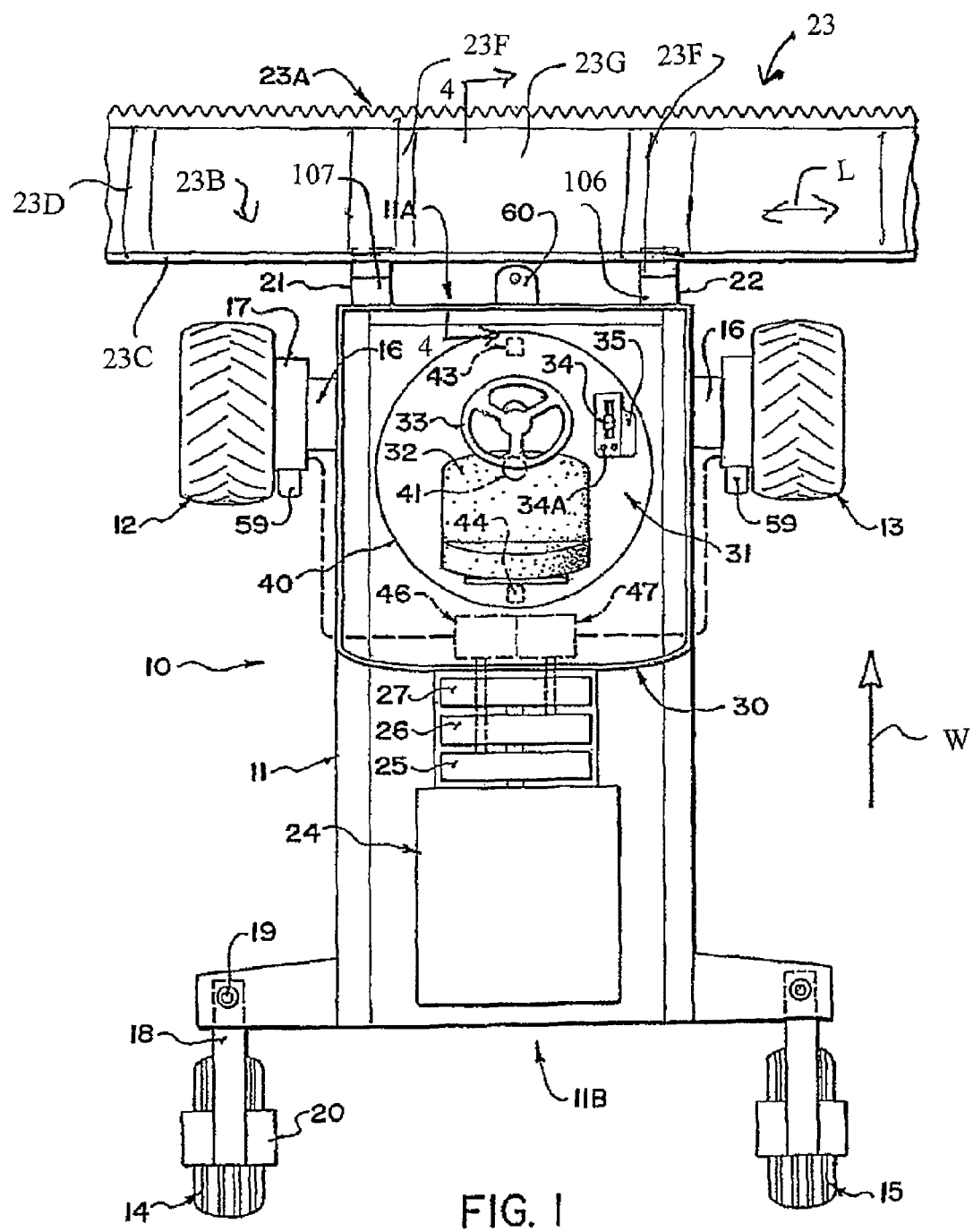
FIG. 1 is a top plan view partly in phantom and partly broken away showing a tractor of the PRIOR ART in the cab forward position.
Figure 2:
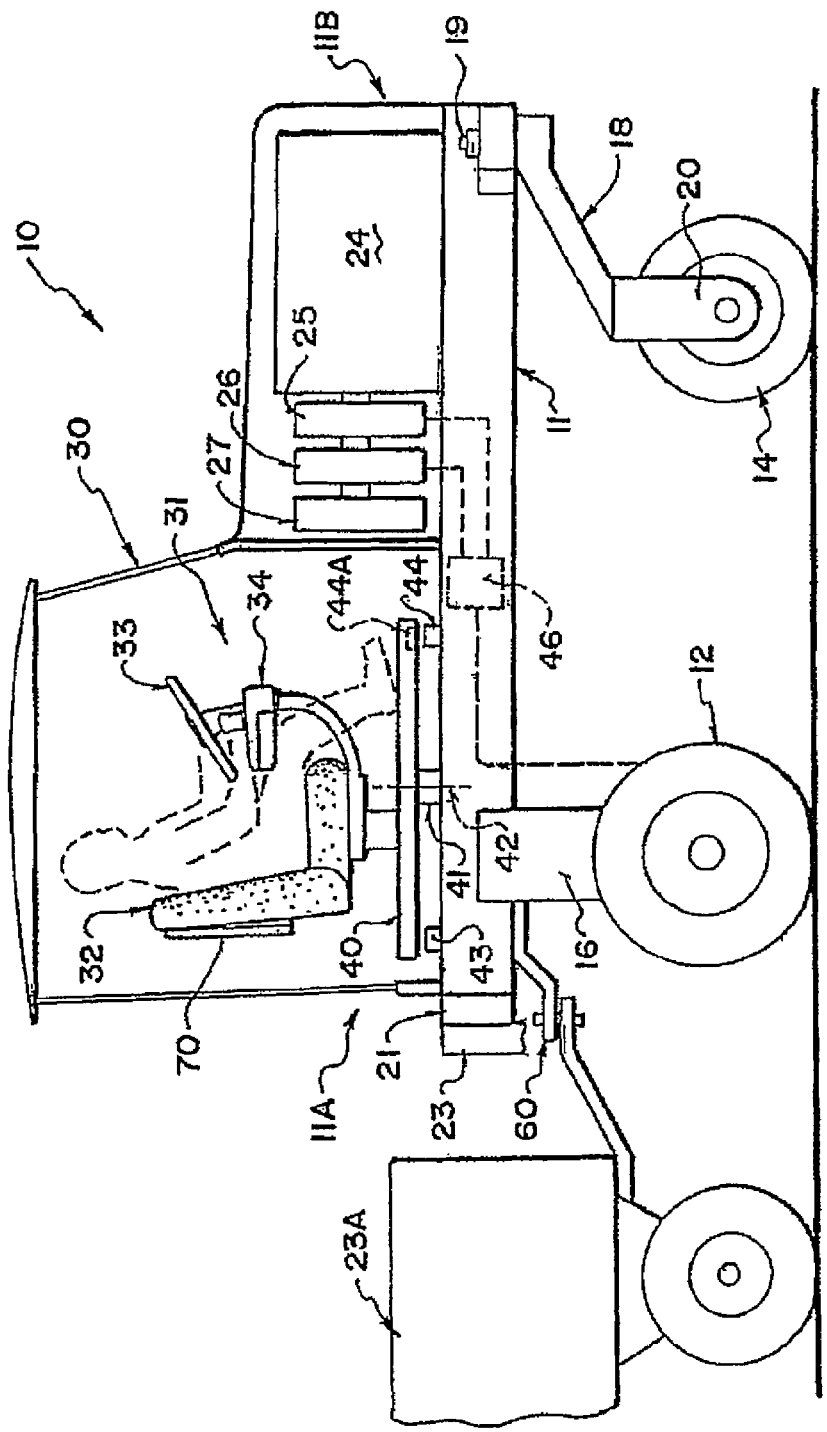
FIG. 2 is a side elevational view of the PRIOR ART tractor of FIG. 1 in which the operator's seat and console have been rotated for operating the tractor in an engine forward position.
Figure 3:
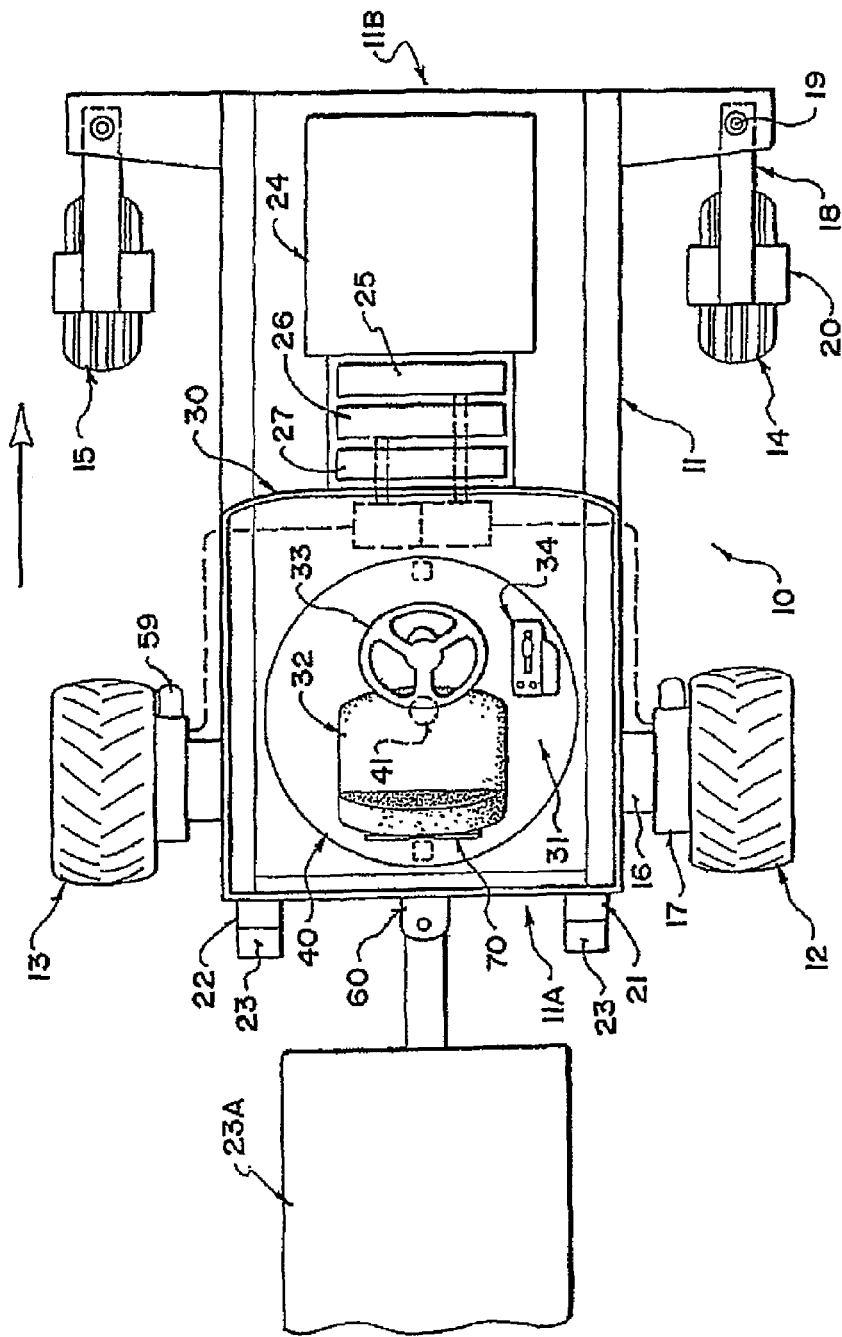
FIG. 3 is a top plan view similar to that of FIG. 1 showing the of the PRIOR ART tractor in the engine forward position.
Figure 4:
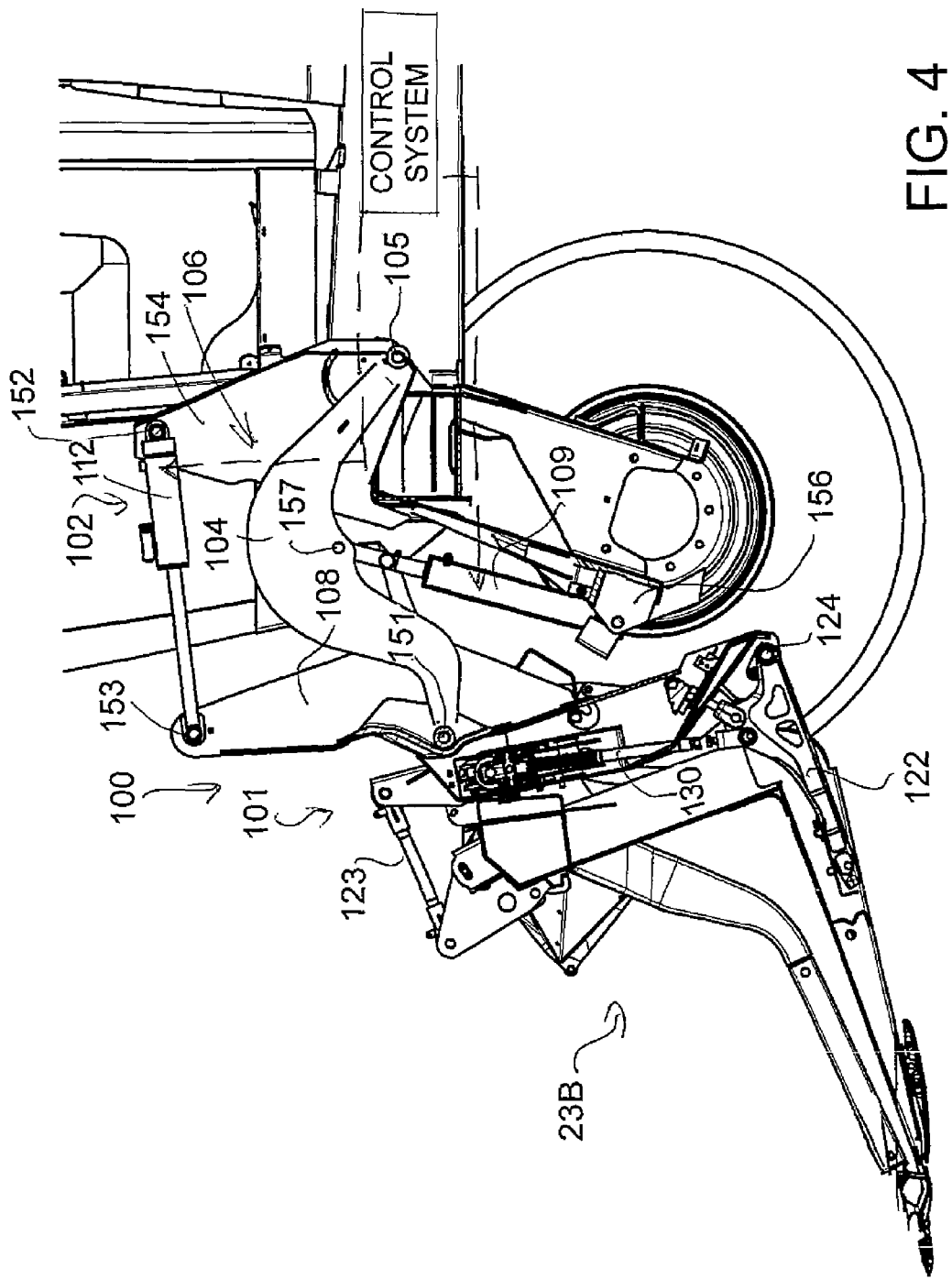
FIG. 4 is a cross-sectional view taken along the lines 4-4 of FIG. 1 showing a tractor of the present invention and particularly showing the connection between the header and the tractor.
Figure 5:
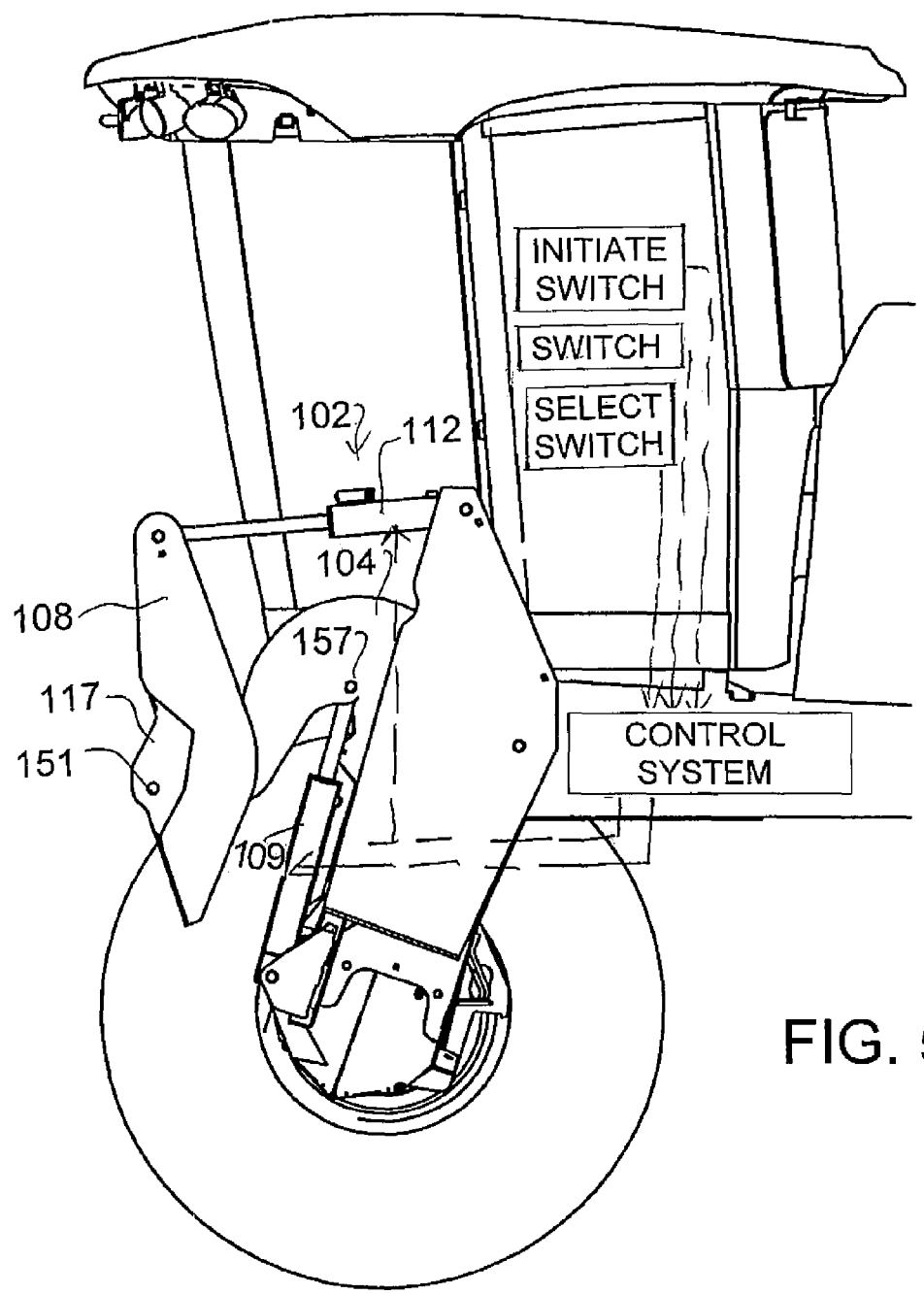
FIG. 5 is a cross-sectional view taken along the lines 4-4 of FIG. 1 showing a tractor of the present invention with the header removed from the tractor.
Figure 5A:
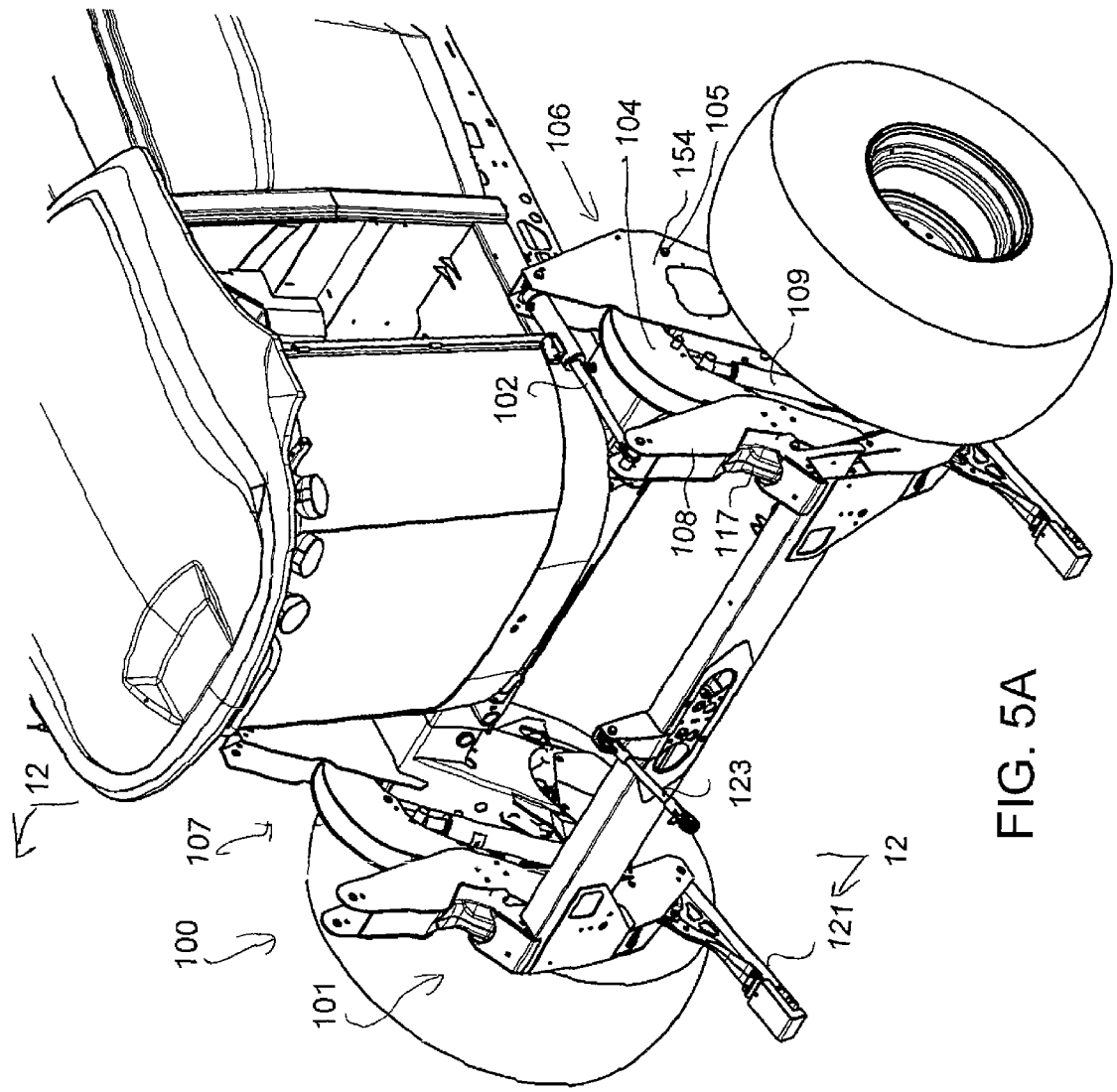
FIG. 5A is an isometric view taken of the forward end of the tractor of FIG. 5 with the header removed from the tractor and showing the mounting system and the float frame.

FIGS. 1 to 3 and the following description of the general arrangement of the tractor are taken from U.S. Pat. No. 7,159,687 defined above and are included for completeness.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependent upon the rate of flow of the hydraulic fluid.

The wheels 14 and 15 are mounted on conventional castors 18 which swivel about a castor pin 19. The ground wheels 14 and 15 are non-driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor.

The operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIGS. 2 and 3 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

In transportation, it is intended therefore that the operator's console is moved to the engine forward position and that the tractor moves forward rapidly at high speed in the transport position at a speed significantly higher than can be achieved in current tractors of this type. When the header is of a relatively narrow width, this header can remain in place and is simply carried behind the tractor. In a situation where the header is of significant width greater than can be accommodated in a road width, the header is disconnected from the supports 21 and 22 and is instead trailed on wheels attached to a hitch 60 at the end 11A of the tractor.

Thus the tractor includes an engine 24 mounted on the tractor frame, at least one hydraulic pump 25, 26, 27 driven by the engine 24 through a transmission for generating a source of hydraulic fluid under pressure for driving components of the tractor and components of the header when attached to the tractor. In particular the hydraulic pumps generate fluid which is controlled by controls 46, 47 to supply fluid under pressure to two driven wheels 12, 13 of the tractor mounted at the first end of the tractor. Speed control and steering control; are provided by the controls 46, 47 in either direction of travel of the tractor. Two non-driven castor wheels 14, 15 of the tractor are mounted at the second end of the tractor. A cab 30 is mounted on the tractor frame at the first end.

There is provided an operator's seat 32 and control assembly 34 arranged for controlling driving movement of the tractor in both a first end forward position and in a second end forward position, the control assembly including a steering control 33 and a speed control 34. Each of the driven wheels 12, 13 includes a respective drive motor 17 driven by hydraulic fluid from the at least one hydraulic pump 25, 26 wherein the speed control 34 is arranged to control a rate of supply of hydraulic fluid from the at least one hydraulic pump to the respective drive motor to control a common speed of rotation of the driven wheels and thus a speed of movement of the tractor. The steering control 33 is arranged to control a differential in rate of supply of hydraulic fluid from the hydraulic pump to the respective drive motor 17 to control a relative speed of rotation of the driven wheels 12, 13 and thus a turning direction of the tractor.

The header 23 includes an elongate header frame 23B defined by a main beam 23C and forwardly extending legs 23D which carry a cutter bar 23A. The cutter extends longitudinally along the front cutter bar of the header frame for cutting the crop when the header is moved in a working direction W generally at a right angle to its longitudinal direction L. Different types of cutter can be used but the typical example comprises a sickle knife. A transport system 23F, generally drapers but other systems can be used, is provided for transporting the crop longitudinally of the header to a central discharge opening 23G of the header so as to form a swath to be deposited on the ground between the wheels 12, 13 of the tractor.

Many of the above components are well known and conventional and can be found in many different designs of such tractors manufactured by a number of manufacturers including the present assignee.

As shown in FIGS. 4 to 13 there is shown a modified arrangement according to the present invention for supporting the header on the tractor in front of the first end when the first end is forwards;

This comprises a mounting arrangement generally indicated at 100 for supporting the header and a float assembly 101 connecting the header frame 23B to the mounting system 100 so as to allow floating movement of the header relative to the tractor.

The mounting arrangement 100 comprises two symmetrical side by side mounting elements 106, 107 each arranged at a respective wheel support. Each includes an upstanding lift member 108 supported at the bottom on a bottom link 104 and at the top on a top link 102. The bottom link 104 is pivoted on the tractor at pin 105 and connects to the lift member 108 at pin 151. The top link includes an actuator 112 pivoted to the wheel assembly 154 at pin 152 and pivoted to the lift member 108 at a pin 153. The bottom link 104 extends in an arch over the frame that supports the motor and drive of the wheel of the tractor.

A lift cylinder 109 is provided for the bottom link of each element 106, 107 so that the elements can be raised and lowered as a common lift system. The lift cylinder 109 extends from the tractor wheel assembly at a mounting 156 to a pin 157 part way along the bottom link 104. Thus actuation of the lift cylinders 109 raises the lift members as a common unit for raising and lowering the mounting system for up and down movement of the header.

The top links 102 includes the cylinder or actuator 112 arranged to change the length of the top links so as to tilt the lift members forwardly and rearwardly about the pivot pin 151. When both the lift cylinders 109 and the actuators 112 are operated, this will change the movement of the upstanding lift members 108 as a common unit from a vertical movement to a complex movement controlled by common operation of the cylinders 109 and 112. This complex movement can be controlled to tilt the header about a transverse axis longitudinal to its length as the header is raised and lowered, thus providing a complex controlled movement of the cutter bar.

The spring float assembly 101 connects the header frame 23B to the lift members 108 so as to allow floating movement of the header relative to the mounting members 106, 107 of the tractor.

Figure 13:
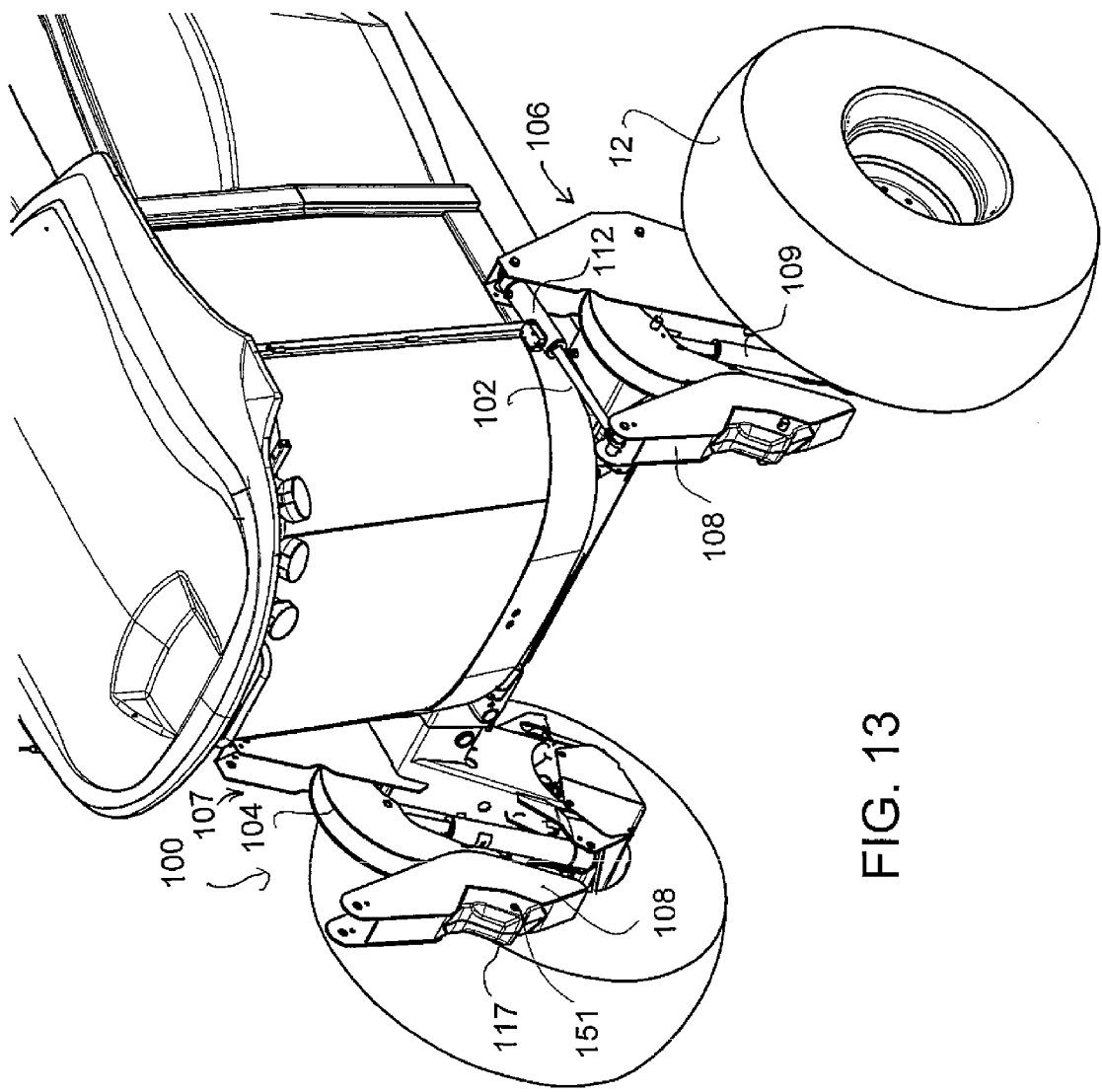
FIG. 13 is an isometric view of the tractor with the header and float frame removed.

The spring float assembly 101 attaches to the lift members 108 by a hook 115 which engages over a support at or adjacent the pin 151 at the upper end and by a latch 116 at the lower end. Thus the tractor moves forward to the float assembly carried on the header as part of the header. The connection as shown in FIG. 13 is tapered or triangular with a forward facing apex 117 so that as the tractor moves forward the engagement of the apex into a receptacle on the assembly 101 can move the header slightly side to side to provide the required alignment for the hook 115 and the latch 116 to be engaged. The connection can be designed in different ways to provide a top and bottom connection which holds the float assembly in position on the lift members 108 to ensure that the float assembly remains attached without risk of becoming separated. This typically requires a connection either at the hook 115 or the latch 116 which is manually inserted to ensure proper and maintained connection. The top hook 115 and the bottom latch 116 hold the spring float assembly 101 at an orientation fixed relative to the lift members 108 so that these elements can pivot as a common construction about the transverse axis at the pin 151.

Figure 6:
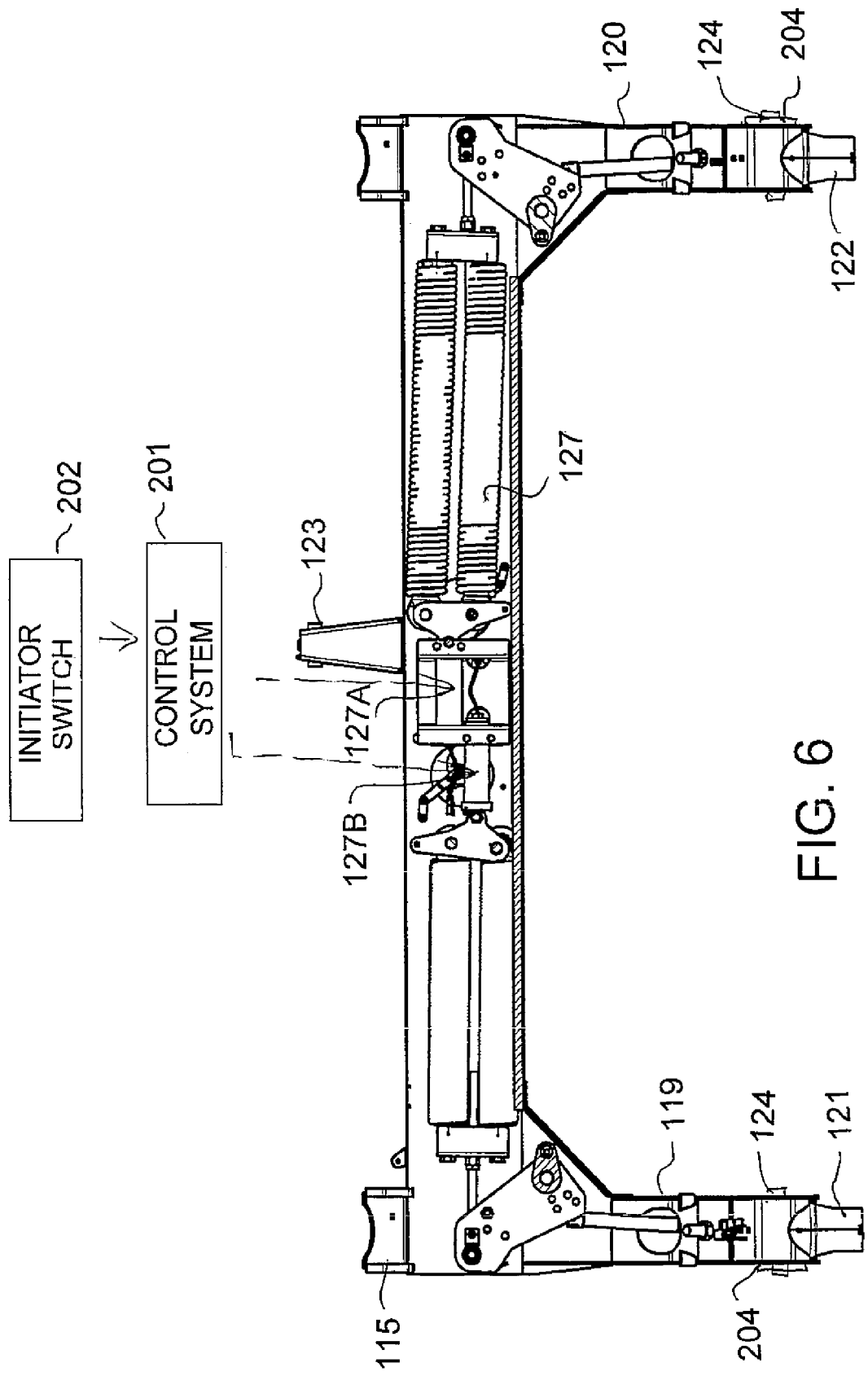
FIG. 6 is a front elevational view of the float assembly of FIG. 4 removed from the header and the tractor and with the front plate removed to show the operating features.
Figure 7:
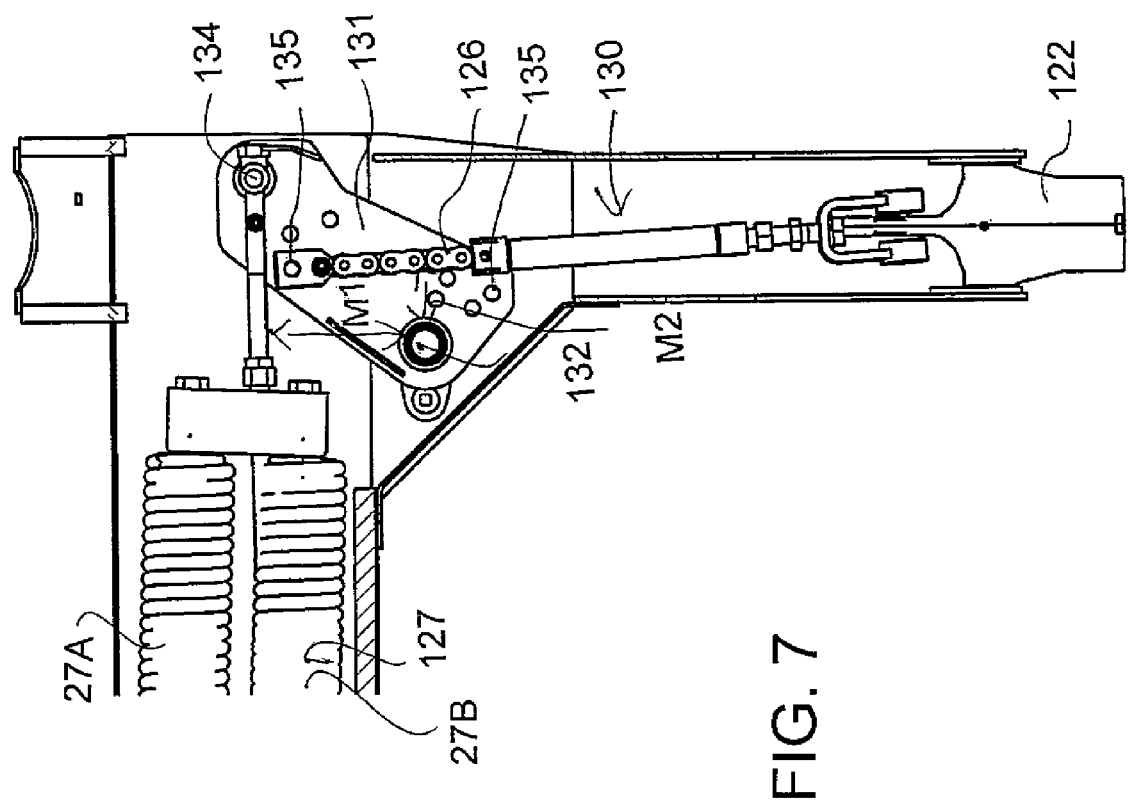
FIG. 7 is a front elevational view of a part only the float assembly of FIG. 4 on an enlarged scale relative to FIG. 6.

The spring float assembly is shown best in FIGS. 6, 7 and 8 as a separate element separated from its header and disconnected from the tractor. However the assembly 101 is provided as a part of the header and is intended to remain connected to the header as an integral element therewith. This allows the assembly to have its springs and lift force tailored to the individual header with which it is intended to be used.

The spring float assembly thus includes the disconnect coupling arrangement defined by the hook and latch 115, 116 for connection to the mounting members arranged when disconnected such that the spring float assembly including at least one resilient spring remains attached to the header.

The assembly 101 includes a rigid frame defining a top bar 118 and two depending legs 119 and 120. The assembly is attached to the header by a pair of bottom lift levers 121 and 122 and a top single center link 123. The levers 121, 122 are pivoted at 124 at a position rearward of the legs 119, 120 and have front ends 125 which engage into respective receptacles in the frame legs 23D of the header frame. The levers 121, 122 are suspended on roller chains 126 connected to springs 127 so that an upward force is communicated to the levers 121, 122 for up and down floating movement of the header on the assembly 101. The link 123 prevents the header from tilting away from the legs but pivots at each end to allow the header to move in an arc as it floats up and down. The link 123 can be provided as an adjustable actuator, typically a hydraulic cylinder to adjust the orientation of the header but in most cases is merely a fixed link which can be manually adjustable at set up only. The single central link also allows one side to float up more than the other so that the levers 121, 122 can operate independently on independent springs 127.

The resilient mechanical coil springs 127 are under tension and stretch and retract in response to the floating movement. The springs are horizontal across the top bar 118 of the spring float assembly. As shown there are two springs 27A, 27B on each side but this can be varied depending on the weights involved.

Figure 7A:
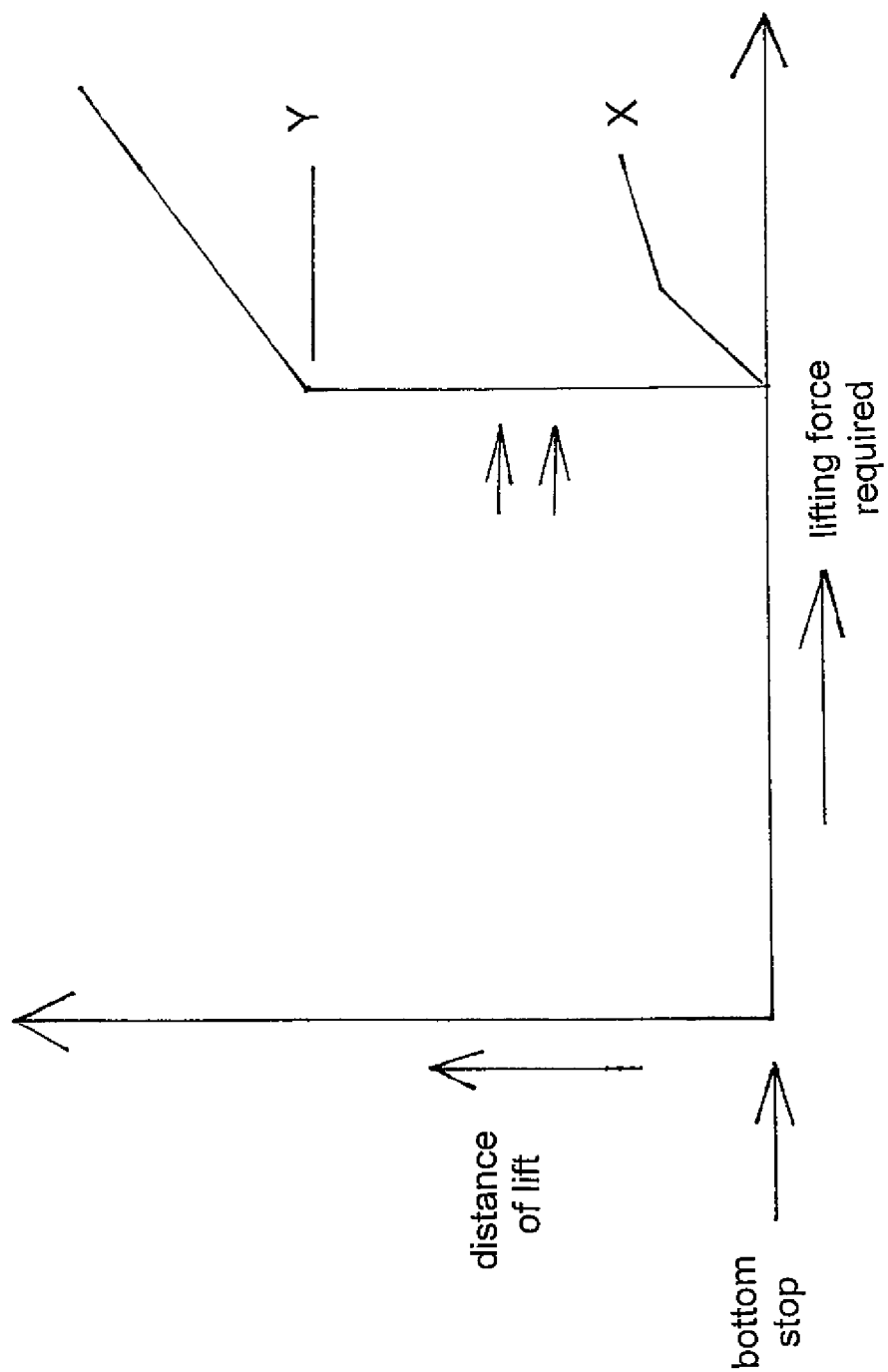
FIG. 7A is graph showing a required lifting force relative to movement of the header from a bottom stop.
Figure 9:
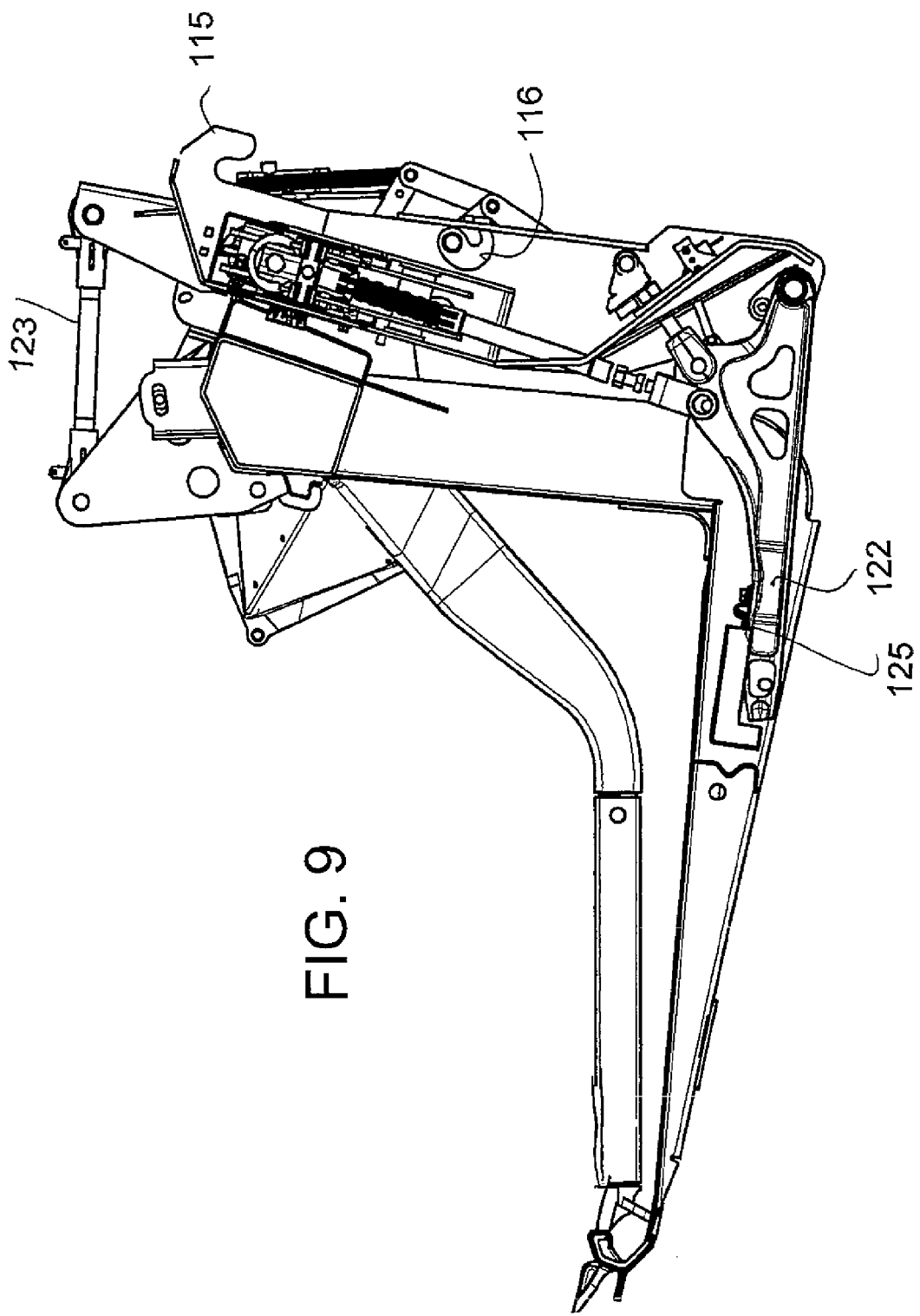
FIG. 9 is a cross-sectional view taken along the lines 9-9 of FIG. 8.

The roller chains 126 form part of couplings 130 from the springs 127 to the levers 121, 122 which extend downwardly to pull upwardly on the levers. The couplings 130 further includes a crank system 131 which is arranged to change a mechanical advantage of the spring force from the spring 127 so as to apply a force to the header frame which is tailored to a required force which is different from the spring force. It will be appreciated that as the springs contract, the spring force provided thereby will reduce. In order to compensate for this reduction, the spring force is applied through the crank system defined by a bell crank 131 connected to the spring 127 at point 134 and applying upward force on the chain 126 at point 135. The crank is pivotal about a pivot pin 132. This generates two moment arms M1 and M2 which change based on the geometry of the bell crank 131. The shape and design of the bell crank is arranged so that as shown in FIG. 7A, the spring force remains constant over a range of movement from a fully extended position X where the header is rested on the ground to a position Y which is the intended upper position of movement of the header. At that point the spring force is rapidly decreased by increasing the moment arm M2 by adding into the movement of the chain 126 a pin 135 carried on the crank 131. The location of the pin 135 can be adjusted in manufacture for different header weights. The tension in the springs can be adjusted at the factory and at the field by adjusting the position of the inner end of the spring on the bar 115 by actuators 127A and 127B shown in FIG. 6.

Thus the coupling is arranged such that the required force includes a first portion which is substantially constant over a range of up and down movement of the header and a second portion at an upper end of the range which decreases so as to reduce the lifting force on the header. Thus if the header floats upward on engaging an obstacle, it floats freely upwardly in the range X to Y and then the lift force decreases rapidly causing the header to fall back to the ground.

The coupling includes the bell crank 131 with the spring 127 connected to the bell crank at one location and the flexible connection or chain 126 which extends from the bell crank for lifting the header. The pin 135 provides an abutment for engaging the flexible connection 126 to change the mechanical advantage or moment arm M2.

Figure 10A:
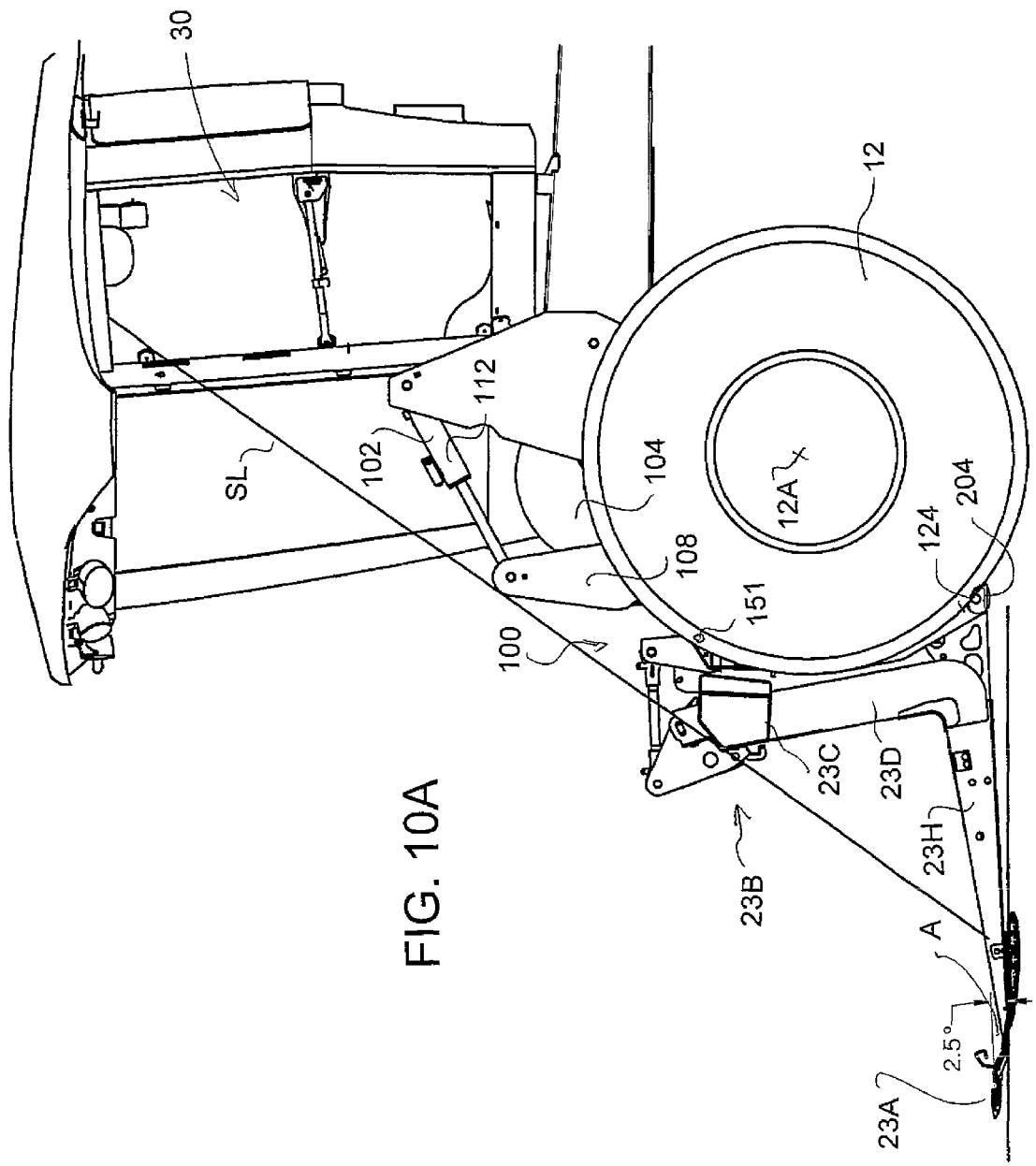
FIG. 10A is a schematic side elevational view of the machine according to the present invention showing the header in a first position in which the cutter bar is at or adjacent the ground for a cutting action and the angle of the cutter bar is rotated to a rearwardmost angle.
Figure 10B:
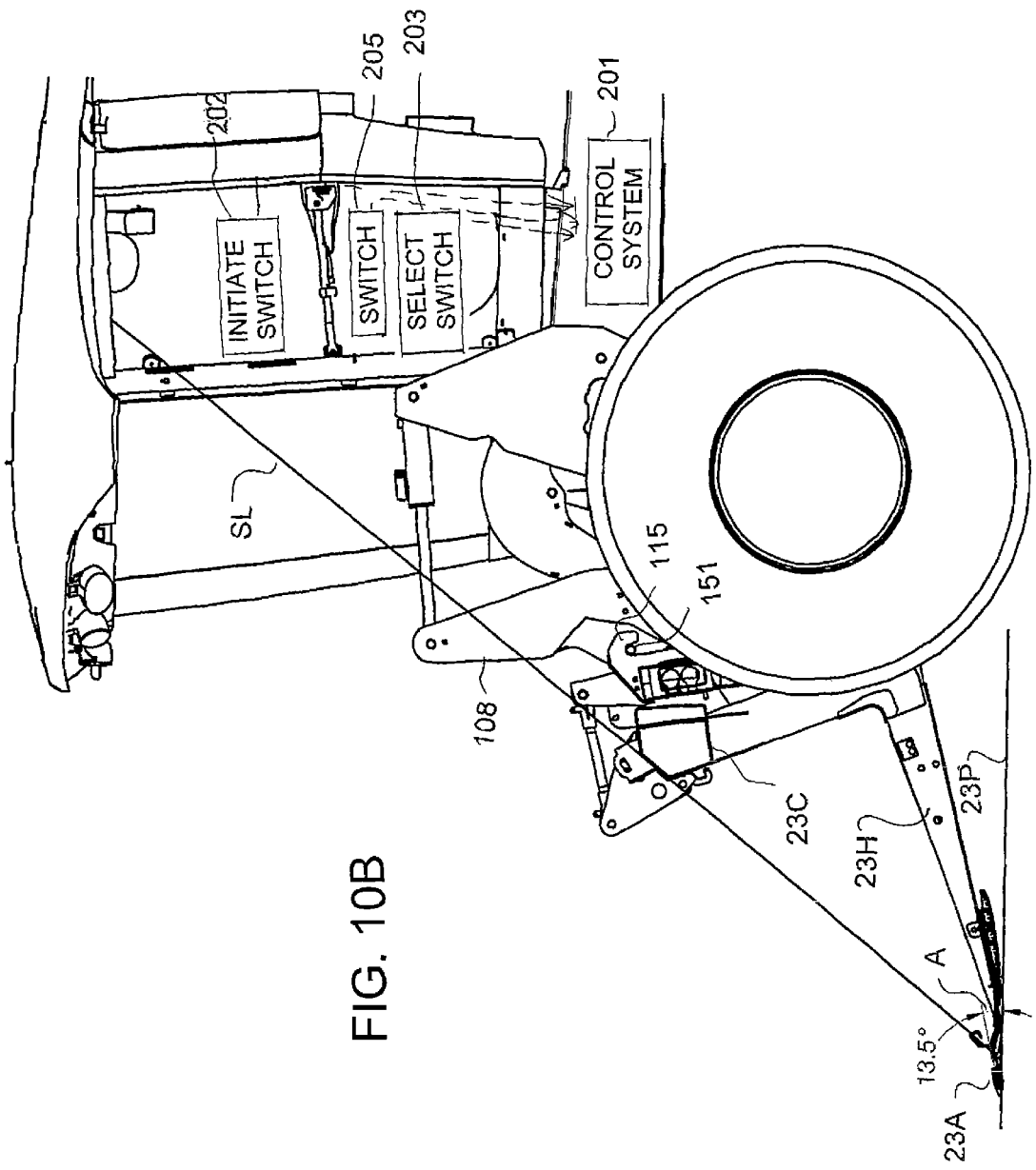
FIG. 10B is a schematic side elevational view of the machine of FIG. 10A showing the header in a second position in which the cutter bar is rotated to a forwardmost angle.

Turning now to FIGS. 10A to 10C, the cab 30 is arranged for containing an operator of the machine including the seat 32 and controls 34 (FIGS. 1 to 3) by which the operator controls the machine.

The mounting system 100 at the first end of the vehicle frame for supporting the header frame 23B at a position in front of the first end includes the bottom links 104 lifted by the lift cylinders 109 and the top links 102 operated by the actuators 112 to provide a lift arrangement for raising and lowering the mounting system defined by the lift members 108.

The mounting system 100 defines the pivot axis 151 longitudinal of the cutter bar that is transverse to the header at which the header is mounted on the mounting system for pivotal movement about the axis of the pin 151. The actuator 112 acts to to tilt the header about the longitudinal axis of the pin 151. The actuator 112 and the mounting system 100 are arranged so as to change an angle A of the cutter 23A relative to a horizontal plane 23P at the ground to different angles relative to the ground. Thus the actuators 112 and 109 and the mounting system are arranged to define a maximum rearward angle A in FIG. 10A of the order of 2.5 degrees to the plane 23P and a maximum forward angle A in FIG. 10B of the cutter relative to the plane of the order of 13.5 degrees to the plane 23P.

These angles have been found to provide an angle change of greater than 10 degrees which is sufficient to ensure that the optimum angles can be selected for different conditions of the crop. Thus in many conditions the crop can be cut most effectively at the rearward position shown in FIG. 10A where the cutter is closest to the horizontal. Where the crop is lying, the header is tilted to a steeper angle up to the maximum angles shown in FIG. 10B. The angle change of greater than 10 degrees and up to 11 degrees has been found to be sufficient to effect the required actions.

As shown in FIG. 10A, the seat 32 defines for the driver or operator a sight line SL for the operator for viewing operation of the header as the cutter moves across the ground. In both positions of the angles A, the sight line SL from the seat passes over the main frame tube 23C to the sickle knife cutter 23A to cause the cutter 23A to be visible at all angles of the cutter from the maximum forward angle to the maximum rearward angle.

The frame of the header further includes a plurality of depending legs including a first portion 23D extending downwardly to a bottom end at the pivot 124 and a second portion 23H extending forwardly to the cutter bar 23A. The mounting system defines the pivot axis of the pin 151 behind the first portion 23D and above the bottom end 124 and above a transverse axis 12A of the first wheels 12, 13. This is achieved because the arms 104 extend over the tractor frame. This supports the pivot axis of the pin 151 at a very high position relative to the ground, immediately behind the beam 23C, at the height of the main beam and at a distance no greater than 24 inches from the main beam 23C. In this way the pivotal movement of the main beam 23C around the pivot axis of the pin 151 is small so that the beam 23C remains at a low height even when fully rotated to the forward angle shown in FIG. 10B.

As explained previously, the header frame is tilted so as to move the cutter between the maximum forward angle and the maximum rearward angle by a combined movement of the actuators 112 and 109 including lifting movement of mounting system by the lifting system and by operation of the actuator to tilt the header about the longitudinal axis. The cutter 23A is maintained at or adjacent the ground during the movement between the maximum forward angle and the maximum rearward angle.

In order to obtain this complex movement generated by the actuators 109 and 112, there is provided a control system 201 arranged to operate the lifting system 109 and the actuator 112 to automatically control movement of the header frame to a required path of movement as the header frame tilts between the maximum forward angle and the maximum rearward angle of the cutter.

The control system 201 is arranged or programmed to operate compound movement of the lifting system 109 and the actuator 112 to automatically control movement of the header frame in a first required path of movement defined by the above movement from the position shown in FIG. 10A to the position shown in FIG. 10B and in a second required path of movement different from the first path from the position shown in FIG. 10 A to the position shown in FIG. 10C. The control system 201 includes an input switch 203 operable by the operator to select the first and second paths. That is the first path of travel acts to change an angle of the cutter to a horizontal plane at the ground to different angles relative to the ground between the maximum forward angle and the maximum rearward angle of the cutter relative to the plane. The second path of travel acts to lift the header from the operating position at one or other of the positions shown in FIGS. 10A and 10B or at positions therebetween to a raised position as shown in FIG. 10C where the header and the cutter bar are at a maximum height from the ground to clear a swath during manoeuvering.

Thus it will be noted that the movement in the first path is constrained by the intention to maintain the cutter bar properly visible to the operator during all positions of the header. It will be appreciated, as is known to operators of such machines that the angle of the header to the plane 23P changes the operation of the cutter system to accommodate different crop conditions. This movement between both maximum positions and throughout the full movement is controlled relative to the sight line SL so that the operation of the cutting knife can be viewed at all positions. This allows the operator to better manage the cutting system to obtain best cutting action at all times and therefore maximum crop harvested. This viewing of the cutter bar is still possible while moving the header through angles of greater than 10 degrees to obtain the required cutting action in different crops. This combined advantage is obtained by locating the pivot axis close to the main beam as explained previously.

It will be appreciated that the complex movement of the header is obtained by the actuators 109 and 112 because the mounting elements of the float frame are carried on the mounting assembly such that the float frame 101 is held in fixed height relative to the mounting assembly 100 so as to be raised and lowered with the mounting assembly, the mounting assembly is arranged to hold the spring float assembly 101 for pivotal movement about the axis of the pin 151 transverse to the tractor and the actuator 112 is operable to cause pivotal movement to selected angles around the axis of the pin 151.

Turning now to FIG. 6 where there is shown the springs 127 which provide the spring force for the spring float of the header. The resilient springs 127 operate on the separate levers 121 and 122 and each includes a respective actuator 127A, 127B operable to adjust a spring force of the resilient spring. The resilient springs 127 are provided on the header as part of the float frame assembly 101 and are therefore associated with a particular header so as to provide an approximate spring force for the weight of the associated header. It will be appreciated that headers of different types vary considerably in weight so that when the springs 127 are provided as part of the header rather than as part of the tractor, the springs can be selected and arranged so that they provide the approximate required spring force for the floating action.

In addition to the approximation provided by this initial selection of the spring force, there is also provided a spring calibration system which provides adjustment to adjust the approximate spring force to an accurate force required for the actual weight of the header which can vary even between common header types where different options for the header are selected. The spring calibration system includes an initiator switch 202 operable by the operator at the seat for initiating a calibration operation.

The system further includes detectors 204 for providing an output signal indicative of a position of the header within the range of floating movement. Each of the detectors is an angle detector 204 of a commercially available type known to persons skilled in this art which is mounted on a pivot arm which moves in response to the position of the header within the range of floating movement and is arranged to detect an angle of the arm relative to a pivot axis of the arm. Thus the detectors 204 are typically mounted on the bottom arms 121, 122 and are arranged to detect an angle of the bottom arm 121, 122 relative to a frame of the spring float assembly at the pivot pin 124.

Figure 11:
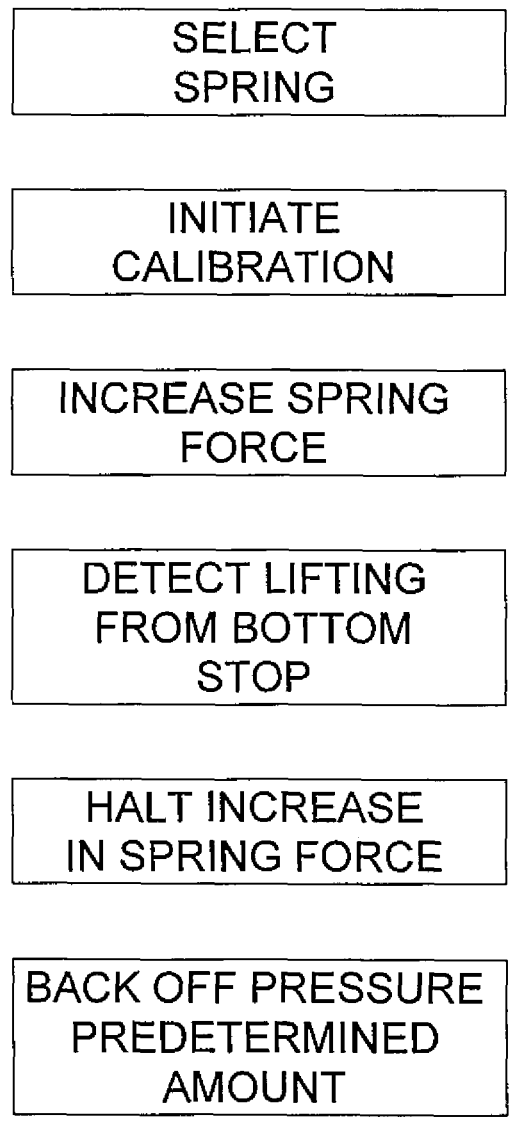
FIG. 11 is a flow chart showing the calibration of the spring force of the float springs.
Figure 12:
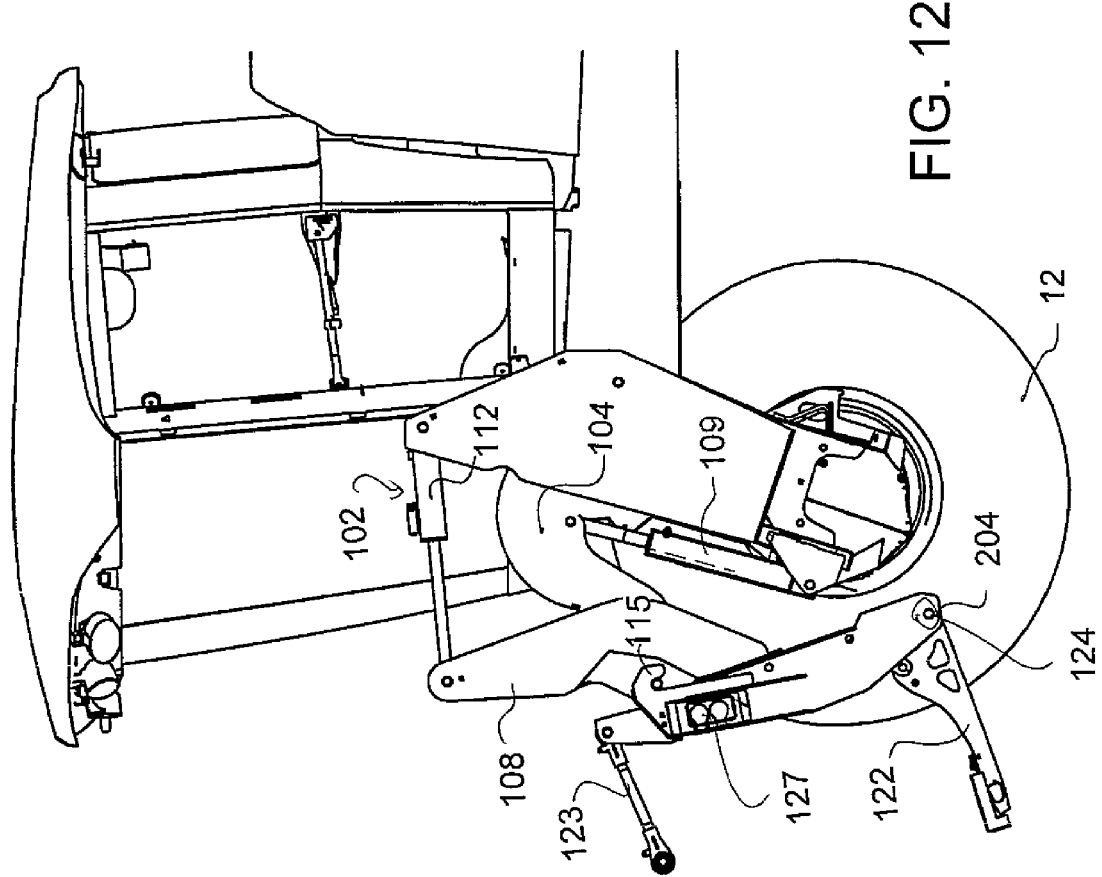
FIG. 12 is a cross-sectional view of the tractor along the lines 12-12 of FIG. 5A.

The control system 201, when the calibration operation is initiated by the switch 202, is arranged to carry out the following functions as set out as a flow chart in FIG. 11:

a) to calibrate the sensors 204 so that the signal provided thereby is accurately representative of the position of the respective lever 121, 122.

b) with both levers 121 and 122 sitting on a bottom stop provided by a suitable mechanical component of the float system, to operate the actuator 127A to gradually and continuously change the spring force of the respective springs 127 to applying a lifting force of the lever 122.

c) using the detector 204 on the lever 122 to detect when the lever 122 moves away from the bottom stop as the spring force is changed. That is, the arms 121 and 122 are at their lowest position and the header is sitting on its bottom stop. The bottom stop can be determined by a lowest angle of the arms 121, 122 by halting their movement when the angle of the arms reaches a maximum downward position. However other bottom stops can be used. The detector 204 is used to detect the angle change of the arms 121, 122 when the arms move off the bottom stop as the spring lifting force increases from the springs 127. When this condition is detected and transmitted to the control device 201, the control device detects the condition or position of the actuator 127A and thus determines the actual spring force required to just lift the header off the bottom stop.

The spring force is increased by moving the actuator 127A to extend deflection of resilient spring 127. The control system is arranged to set the actuator 127A at a condition which is adjusted by a predetermined amount from that spring force which was determined when the header moved off the bottom stop. That is the actuator is backed off from the required force by a predetermined amount to reduce the spring force applied just below that required to lift the header off the bottom stop by a predetermined amount of spring force. When the actuator 127A is a distance movement such as an electrically driven screw, the screw can be backed off by a predetermined distance which equates to a predetermined spring force. Where the actuator is a hydraulic cylinder as shown, the pressure required to just lift off the bottom stop is determined and then the pressure required is backed off by a set pressure difference which again is equivalent to a predetermined spring force. In this way the actual spring force required to just drop the header onto the bottom stop is calibrated and accurately set.

Steps a) b) and c) are repeated for the lever 121 and the actuator 12B.

In operation of the machine, the header is maintained at a position so that the header can float upwardly and downwardly from an initial set position between the bottom stop and a highest allowable position. Thus the float range is optimized and the header can float downward where the ground level falls and can float upwardly where the ground level rises or where an obstacle is encountered.

This condition is maintained by operating the detectors 204 to provide an output signal indicative of the position of the header within the range of floating movement relative to a position fixed in height relative to the mounting assembly which is in this case the bottom stop but could be other fixed positions. Both detectors can be used to provide a compound signal determined from the positions of both sensors. The control system 201 is then arranged to be responsive to the signal from the detectors 204 for controlling the lift provided by cylinders 109 so as to raise and lower the lift arrangement mounting arms 104 with an objective to maintain the signal constant. That is the header is maintained at a set position in the float range as determined by the angle detector 204 by raising and lowering the lift arms 104. In this way the amount of lift force is maintained constant since the springs 127 are at a set point in their extension and thus provide a set lifting force, bearing in mind that the spring force is directly proportional to the extension of the spring which is maintained constant. Thus the height of the lift arms is controlled by the lift cylinders 109 under control of the control system 201 based on the signal from the detector with the objective of keeping the signal as constant as possible thus maintaining the lift spring force as constant as possible.

As explained previously and shown in FIG. 7A, the spring force is arranged by the connection of the spring to the arms 121 to provide a spring force which has a predetermined pattern where the spring force includes a first portion which is substantially constant over a range of up and down movement of the header and a second portion at an upper end of the range which decreases so as to reduce the lifting force on the header. In this way the spring lifting force remains constant over the first range so that the weight of the header on the ground remains constant over this range. However, as the header moves upwardly out of this range, its lifting force decreases rapidly thus rapidly increasing its effective weight and forcing it down more quickly to the ground.

The above control system thus acts to maintain the header frame at a preferred position in the total range of movement. However there is provided a manually operable input switch 205 operable by an operator of the swather for adjusting the preferred position within the force diagram of FIG. 7A. This is achieved by changing the value of the signal from the detectors 204 toward which the system strives. Thus the control system will act to raise and lower the lift arms 104 to different positions depending on the set required angle in respect of the signal from the detectors 204.

The invention claimed is:

1. A swather comprising:
a crop header for cutting a standing crop comprising:
a header frame;
a cutter extending across a front cutter bar of the header frame for cutting the crop;
and a transport system operable to transport the crop to a central discharge opening of the header so as to form a swath;
a tractor for carrying the header comprising:
a tractor frame having a first end and a second end;
ground wheels for supporting the tractor in movement across the ground including a pair of transversely spaced first wheels at the first end;
a mounting assembly carried on the tractor frame at the first end of the tractor frame for supporting the header;
a spring float assembly attached to the mounting assembly at a position on the mounting assembly so as to connect the header frame to the mounting assembly and so as to allow floating movement of the header frame relative to the mounting system over a range of floating movement;
a lift arrangement for providing raising and lowering movement of said position on the mounting assembly relative to the tractor so as to change a distance of said position on the mounting assembly from the ground, said lift arrangement being arranged to hold the mounting assembly in fixed position determined by the lift arrangement to prevent float of the mounting assembly under loads from the header;
the first ground wheels and the mounting assembly being arranged such that the swath when discharged from the central discharge opening the swath passes between the first ground wheels and components of the mounting assembly so as to be deposited as a swath behind the tractor;
wherein the mounting assembly is arranged to hold a frame of the spring float assembly in a position which is fixed in height relative to the mounting assembly so that the frame of spring float assembly moves upwardly and downwardly with the mounting assembly;
the spring float assembly including a first and a second support arms spaced transversely of the header each extending forwardly from a respective one of first and second pivot connections on the spring float assembly to the header for supporting a respective one of first and second sides of the header;
the spring float assembly including first and a second resilient spring assemblies each of which flexes in response to the floating movement with each spring assembly being arranged on a respective side of the mounting system and engaging a respective one of the first and second support arms;
the spring float assembly including said first and second resilient spring assemblies and said first and second pivot connections being mounted so as to be raised and lowered by said raising and lowering movement of said position on the mounting assembly;
a detector for providing an output signal indicative of a position of the header within the range of floating movement relative to a position fixed in height relative to the mounting assembly;
and a control system responsive to said output signal from said detector for controlling the lift arrangement, the control system including components arranged so as to raise and lower the lift arrangement with an objective to maintain the signal constant.

2. The swather according to claim 1 wherein each of said first and second spring assemblies is horizontal across a top of the spring float assembly.

3. The swather according to claim 1 wherein each of said first and second spring assemblies includes first and second couplings which extend downwardly to pull upwardly on the first and second arms.

4. The swather according to claim 3 wherein the couplings each includes a crank system which is arranged to change a mechanical advantage of the spring force from the respective one of the first and second springs so as to apply a force to the header frame which is tailored to a required force different from the spring force.

5. The swather according to claim 4 wherein each coupling is arranged such that the required force includes a first portion which is substantially constant over a range of up and down movement of the header and a second portion at an upper end of the range which decreases so as to reduce the lifting force on the header.

6. The swather according to claim 1 wherein the mounting assembly is arranged to hold the spring float assembly for pivotal movement about an axis transverse to the tractor and wherein there is provided an actuator operable to cause pivotal movement to selected angles around the axis.

7. The swather according to claim 1 wherein the mounting assembly comprises a pair of arms each pivotal on the tractor about an axis transverse to the tractor with the spring float assembly connected at fixed position on a forward end of the arms and wherein the lift arrangement is arranged for lifting the arms in common parallel movement.

8. The swather according to claim 1 wherein the detector is mounted on a pivot arm which moves in response to the position of the header within the range of floating movement and is arranged to detect an angle of the arm relative to a pivot axis of the arm.

9. The swather according to claim 1 wherein the detector is mounted on one of the first and second bottom arms and is arranged to detect an angle of said arm relative to a frame of the spring float assembly.

* * * * *